United States Patent
Ito

(10) Patent No.: US 9,393,989 B2
(45) Date of Patent: Jul. 19, 2016

(54) CLUTCH DEVICE AND STEERING DEVICE

(75) Inventor: Koichi Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 102 days.

(21) Appl. No.: 14/420,485

(22) PCT Filed: Aug. 27, 2012

(86) PCT No.: PCT/JP2012/005368
§ 371 (c)(1),
(2), (4) Date: Feb. 9, 2015

(87) PCT Pub. No.: WO2014/033771
PCT Pub. Date: Mar. 6, 2014

(65) Prior Publication Data
US 2015/0197275 A1      Jul. 16, 2015

(51) Int. Cl.
| B62D 5/00 | (2006.01) |
| F16D 11/06 | (2006.01) |
| F16D 11/16 | (2006.01) |
| F16D 27/14 | (2006.01) |
| F16D 11/00 | (2006.01) |
| F16D 23/12 | (2006.01) |

(52) U.S. Cl.
CPC .............. *B62D 5/003* (2013.01); *F16D 11/06* (2013.01); *F16D 11/16* (2013.01); *F16D 27/14* (2013.01); *F16D 2011/006* (2013.01); *F16D 2023/123* (2013.01)

(58) Field of Classification Search
CPC .......... B62D 5/003; F16D 11/06; F16D 11/16; F16D 2011/006
See application file for complete search history.

(56) References Cited

U.S. PATENT DOCUMENTS

| 2014/0066254 A1* | 3/2014 | Murakami ............ B60W 10/20 477/167 |
| 2015/0291206 A1* | 10/2015 | Ito .......................... B62D 5/003 180/405 |

FOREIGN PATENT DOCUMENTS

| IT | FR 2790524 A1 * | 9/2000 | .............. F16D 7/048 |
| JP | 2000-346103 A | 12/2000 | |
| JP | 2004-025932 A | 1/2004 | |
| JP | 2005-132327 A | 5/2005 | |
| JP | 2009-040095 A | 2/2009 | |
| JP | 2014062632 A * | 4/2014 | .............. B62D 5/04 |

* cited by examiner

*Primary Examiner* — Kevin Hurley
(74) *Attorney, Agent, or Firm* — Oliff PLC

(57) ABSTRACT

A clutch device includes: a handle-side housing in which a plurality of lock grooves are formed to be spaced apart from each other in an inner circumference and in a circumferential direction; a tire-side housing; a plurality of lock bars that are provided on the tire-side housing so as to be capable of moving in a radial direction of the tire-side housing and arranged to be spaced apart from each other in a circumferential direction of the tire-side housing; and an advancing/retracting mechanism that causes the lock bar to advance and retract in a direction toward the lock groove.

5 Claims, 13 Drawing Sheets

CLUTCH DEVICE AND STEERING DEVICE

TECHNICAL FIELD

The present invention relates to a clutch device, and in particular, to a clutch device to be used in a vehicle steering device.

BACKGROUND ART

Various vehicle steering systems, which are referred to as a so-called steer by wire system, have been recently developed toward practical use. In conventional vehicles, a steering wheel and a steered wheel are generally and mechanically connected together through a mechanism such as a rack and pinion. In the steer by wire system, however, such mechanical connection is not provided, and a wheel is actually turned in the following way: a. steering angle suitable for a traveling state of a vehicle is determined by detecting with a sensor an input from a driver, such as, for example, torque, a steering angle, or the like, also in combination with information from other vehicle sensors; and the steering angle command is sent to a steering actuator.

When the steer by wire system is to be adopted, a connection mechanism by which a steering wheel and a steered wheel are mechanically connected together, or a similar mechanism, which is a mechanism for so-called fail-safe, is generally prepared separately from the steer by wire system, in order to secure steering performance if the steer by wire system is in a failure state. As such a mechanism, a steering device including, for example, a planet gear clutch is known (see Patent Document 1).

RELATED ART DOCUMENT

Patent Document

[Patent Document 1] Japanese Patent Application Publication No. 2009-040095

DISCLOSURE OF THE INVENTION

Problem to be Solved by the Invention

In the steering device described in Patent Document 1, however, a steering wheel and a tire are connected together via a planet gear clutch even when a lock part is released, and an input from a road surface is transmitted to the steering wheel. Accordingly, there is room for an improvement in the feeling occurring when steering is performed.

The present invention has been made in view of such a situation, and a purpose of the invention is to provide a new clutch device by which a steering feeling can be improved in a steering device.

Means for Solving the Problem

In order to solve the aforementioned problem, a clutch device of an aspect of the present invention is one in which transmission and cutoff of rotational force between two rotating shafts is switched, and the clutch device comprises: a first rotating shaft in which a plurality of groove portions are formed to be spaced apart from each other in an inner or outer circumference and in a circumferential direction; a second rotating shaft that is arranged coaxially with the first rotating shaft and arranged such that at least part of the second rotating shaft overlaps the first rotating shaft; a plurality of engaging parts that are provided on the second rotating shaft so as to be capable of moving in a radial direction of the second rotating shaft and arranged to be spaced apart from each other in a circumferential direction of the second rotating shaft; and an advancing/retracting mechanism that causes the engaging part to advance and retract in a direction toward the groove portion. The plurality of engaging parts have: a first engaging part that enters any one first groove portion of the plurality of groove portions, when the plurality of engaging parts are moved toward the plurality of groove portions by the advancing/retracting mechanism, irrespective of a rotational phase difference between the first rotating shaft and the second rotating shaft; and a second engaging part that enters a second groove portion different from the first groove portion, when the first engaging part moves in one rotational direction of the clockwise and counter-clockwise directions in a state of entering the first groove portion and engages one of the two side surfaces of the first groove portion, the one side surface being located on the one rotational direction side. The second engaging part is configured such that, when entering the second groove portion, it engages one of the two side surfaces of the second groove portion, the one side surface being located on the other rotational direction side.

According to this aspect, a separation state can be obtained with the engaging parts being caused to retract from the groove portions by the advancing/retracting mechanism, in which the rotational force between the first rotating shaft and the second rotating shaft is not transmitted. On the other hand, in a state where the first rotating shaft and the second rotating shaft are connected together by the advancing/retracting mechanism, the first engaging part engages one of the two side surfaces of the first groove portion, the one side surface being located on the other rotational direction side, when the first rotating shaft is rotated in one rotational direction, and hence the rotational force can be transmitted to the second rotating shaft in a state where there is little play. When the first rotating shaft is rotated in the other rotational direction, the second engaging part engages one of the two side surfaces of the second groove portion, the one side surface being located on the one rotational direction side, and hence the rotational force can be transmitted to the second rotating shaft in a state where there is little play.

The advancing/retracting mechanism may have both an actuator driven by electricity and a biasing member that biases the engaging part toward the groove portion. The advancing/retracting mechanism may also be configured such that: the advancing/retracting mechanism causes the engaging part to retract from the groove portion with force larger than the biasing force of the biasing member by a movement occurring when the actuator is powered; and when the power supply to the actuator is stopped, the advancing/retracting mechanism causes the first engaging part to enter the first groove portion by the biasing force of the biasing member. Thereby, in an emergency when the power supply to the actuator is stopped, the first rotating shaft is instantly connected to the second rotating shaft with the first engaging part entering the first groove portion.

The actuator is a rotary type solenoid, and the advancing/retracting mechanism may further include a conversion mechanism that causes the engaging part to advance and retract by converting a rotational movement of the rotary type solenoid. Thereby, the length in the shaft direction of the clutch device can be suppressed.

When it is assumed that: the number of the plurality of groove portions is n; the pitch of the groove portions is P, the number of the plurality of engaging parts is N, the number of engaging parts that enter the plurality of groove portions is Nx, the width of the engaging part is W, the width of the groove portion is B1, a distance between the adjacent groove portions is B2, and a gap angle occurring when the engaging part is engaged with the groove portion is δ, the engaging part and the groove portion may be provided to satisfy: P=360/n; B1≈W+(δ×(Nx−1)); and δ=P/N. Thereby, design can be achieved, in which, for example, a gap angle occurring upon connection is taken into consideration.

Another aspect of the present invention is a steering device. This steering device comprises: an operation member that is rotated for steering a vehicle; a detection device that detects information in accordance with an operation amount of the operation member; a turning mechanism that turns a wheel; a power source that drives the turning mechanism; a clutch device that is arranged between the operation member and the turning mechanism is and switches transmission and cutoff of rotational force between the operation member and the turning mechanism; and a controller that drives the power source in a state where the rotational force is cut off by the clutch device and that controls a turning amount based on the information in accordance with the operation amount. The operation member is coupled to one of the first rotating shaft and the second rotating shaft; the turning mechanism is coupled to the other of the first rotating shaft and the second rotating shaft; and the clutch device is configured in the following way: the first rotating shaft and the second rotating shaft are mechanically coupled together such that a steering angle of the wheel is changed in accordance with an operation of the operation member in a state where the rotational force between the operation member and the turning mechanism can be transmitted.

According to this aspect, a torque variation, etc., is not transmitted from the turning mechanism to the operation member, when, for example, the power source is driven in a state where the rotational force is cut off by the clutch device and the turning amount is controlled based on information in accordance with the operation amount of the operation member, and hence a steering feeling can be improved.

Advantage of the Invention

According to this invention, a new clutch device can be achieved, by which a steering feeling in a steering device can be improved.

BEST MODE FOR CARRYING OUT THE INVENTION

Figure 1:
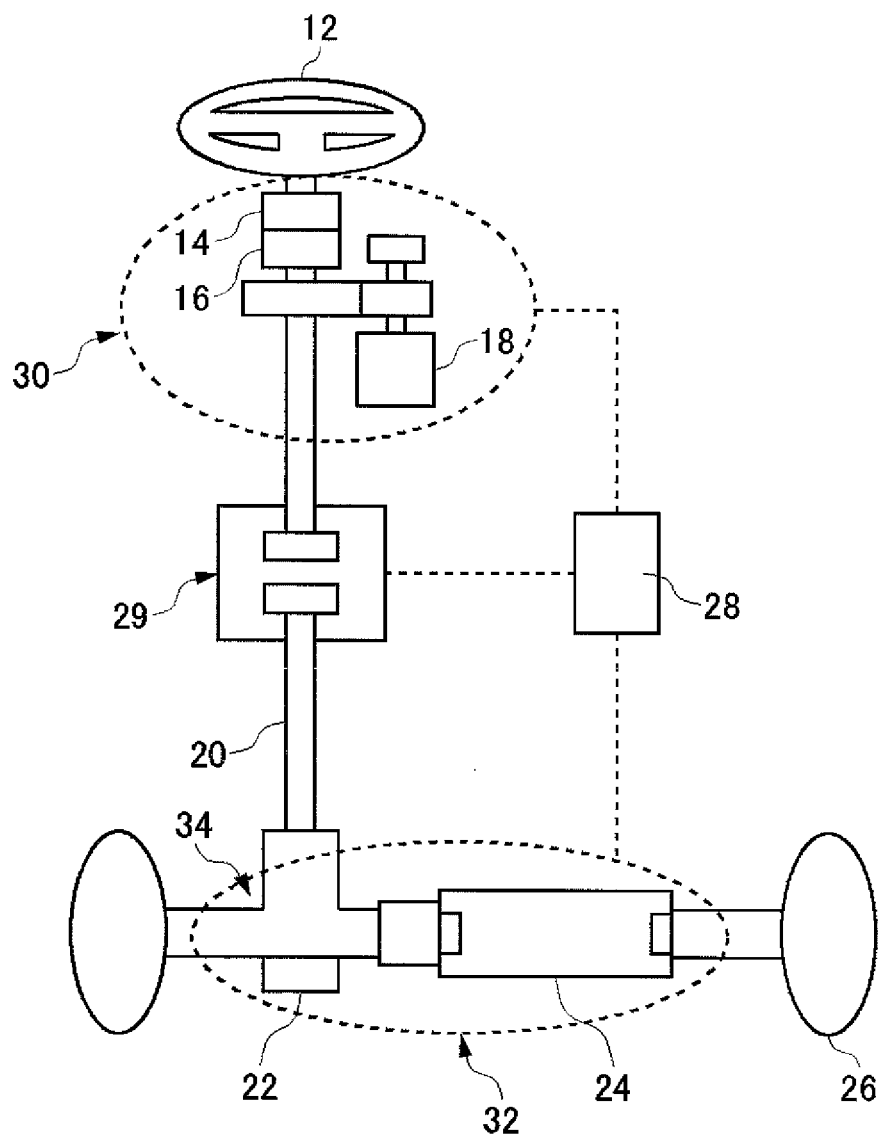
FIG. 1 is a schematic view illustrating a schematic configuration of a vehicle steering device according to First Embodiment.

Hereinafter, preferred embodiments for carrying out the present invention will be described in detail with reference to the accompanying drawings. In the description of the drawings, like elements will be denoted with like reference numerals and duplicative description will be appropriately omitted. The clutch devices described in the following embodiments can be applied to a steering device in a vehicle. They are particularly preferred for a so-called steer by wire type vehicle steering device, namely, for a vehicle steering device in which a wheel is turned in accordance with an operation of an operation member, such as a steering wheel, etc., provided in a steering part, by the power of a power source provided in a turning part under electrical control, not by the steering force applied to the operation member.

(First Embodiment)

FIG. 1 is a schematic view illustrating a schematic configuration of a vehicle steering device according to First Embodiment. A vehicle steering device 10 includes a handle 12, a steering angle sensor 14, a torque sensor 16, a steering reaction force motor 18, an intermediate shaft 20, a turning angle sensor 22, a turning motor 24, a tire 26, an ECU 28, and a clutch device 29.

A steering actuator 30 is formed by the steering angle sensor 14, the torque sensor 16, and the steering reaction force motor 18. A turning actuator 32 is formed by the turning angle sensor 22 and the turning motor 24. The ECU 28 controls the steering reaction force motor 18 and the turning motor 24 based on information from various sensors included in the steering actuator 30 and the turning actuator 32.

The handle 12 is arranged on the driver's seat side in a vehicle interior and functions as a steering member a driver rotates for inputting a steering amount.

The steering angle sensor 14 detects a rotation angle of the handle 12 as a steering amount inputted by a driver, and outputs this detected value to the ECU 28. The steering angle sensor 14 functions as a detection device that detects information in accordance with an operation amount of the handle 12.

The torque sensor 16 detects torque in accordance with a steering amount of the handle 12. The steering reaction force motor 18 makes reaction force act on the handle 12 based on the control of the ECU 28, by the reaction force a driver feeling steering reaction force in accordance with the rotation angle of the handle 12 detected by the steering angle sensor 14.

The ECU 28 is formed, for example, by a CPU, a ROM, a RAM, and a data bus that connects them together, and functions as a controller that performs control according to a program stored in the ROM, in which: the ECU 28 detects a rotation angle of the handle 12 as a steering amount inputted by a driver in order to calculate a turning amount based on the steering amount; and the ECU 28 turns the tire 26 by controlling the turning motor 24 based on the turning amount.

The turning motor 24 forms a turning device that makes a rack bar move in the vehicle width direction based on the control by the ECU 28, the rack bar being coupled to the tire 26 via a tie rod to be capable of extending in the vehicle width direction.

The turning angle sensor 22 detects a rotation angle of a pinion of a rack and pinion mechanism 34 that forms the turning device, and outputs this detected value to the ECU 28.

The intermediate shaft 20 plays a role of transmitting steering force (rotational force) from the steering actuator 30 to the turning actuator 32 as part of a backup mechanism working when a steer by wire system does not function. The mechanical backup mechanism is formed by the intermediate shaft 20, the clutch device 29, and the rack and pinion mechanism 34, etc.

The clutch device 29 switches transmission and cutoff of the rotational force between two rotating shafts. Detailed structures of the clutch device 29 will be described later, but when the system is in a normal state, the steering actuator 30 and the turning actuator 32 is disconnected from each other by the clutch device 29, and the vehicle steering device 10 functions as a steer by wire system. On the other hand, when the system is in an abnormal state, the steering actuator 30 and the turning actuator 32 are mechanically coupled together by the clutch device 29, so that the vehicle steering device 10 can directly turn the tire 26 by an operation of the handle 12.

Figure 2:
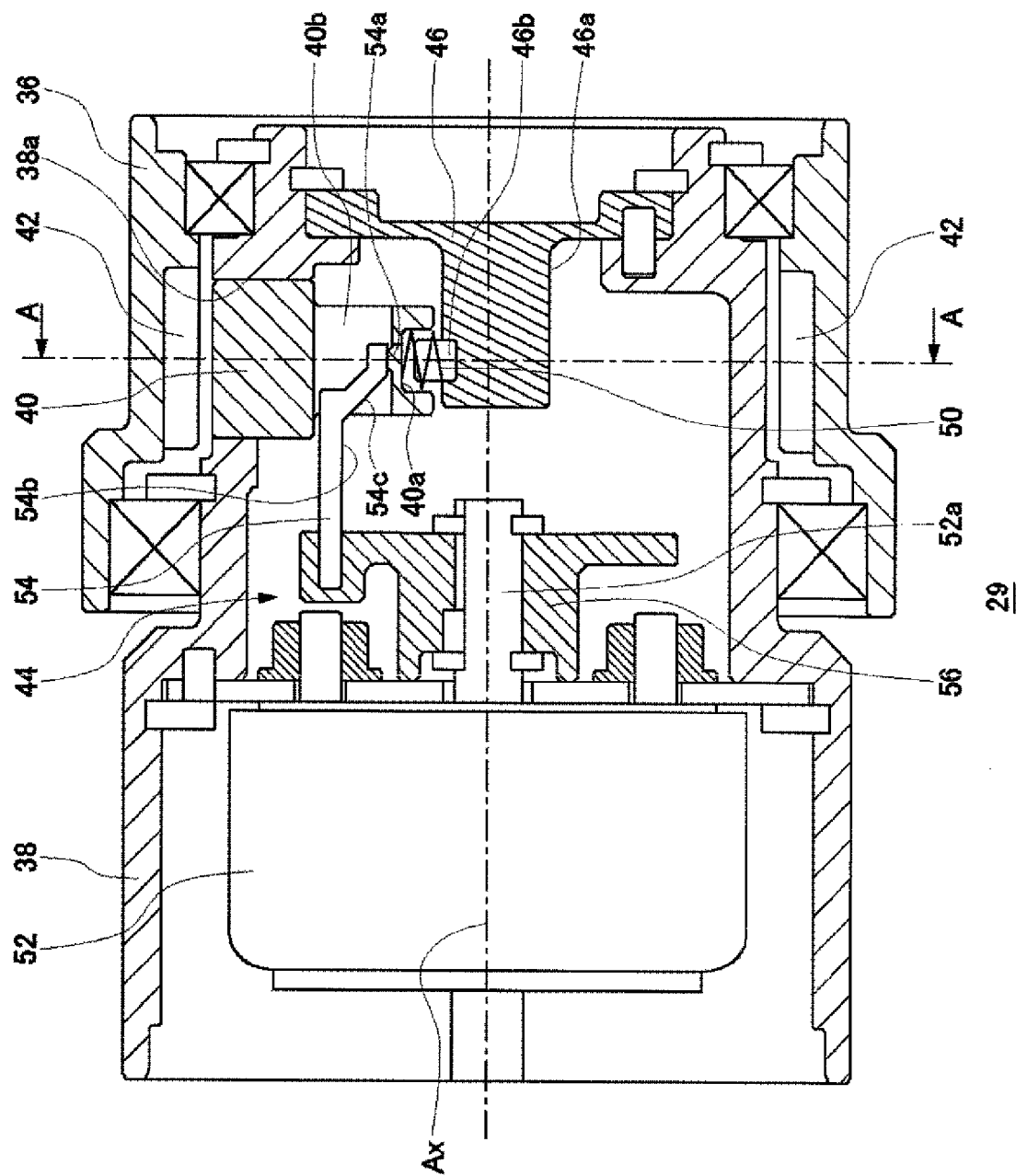
FIG. 2 is a sectional view parallel to the shaft of a clutch device according to First Embodiment.
Figure 3:
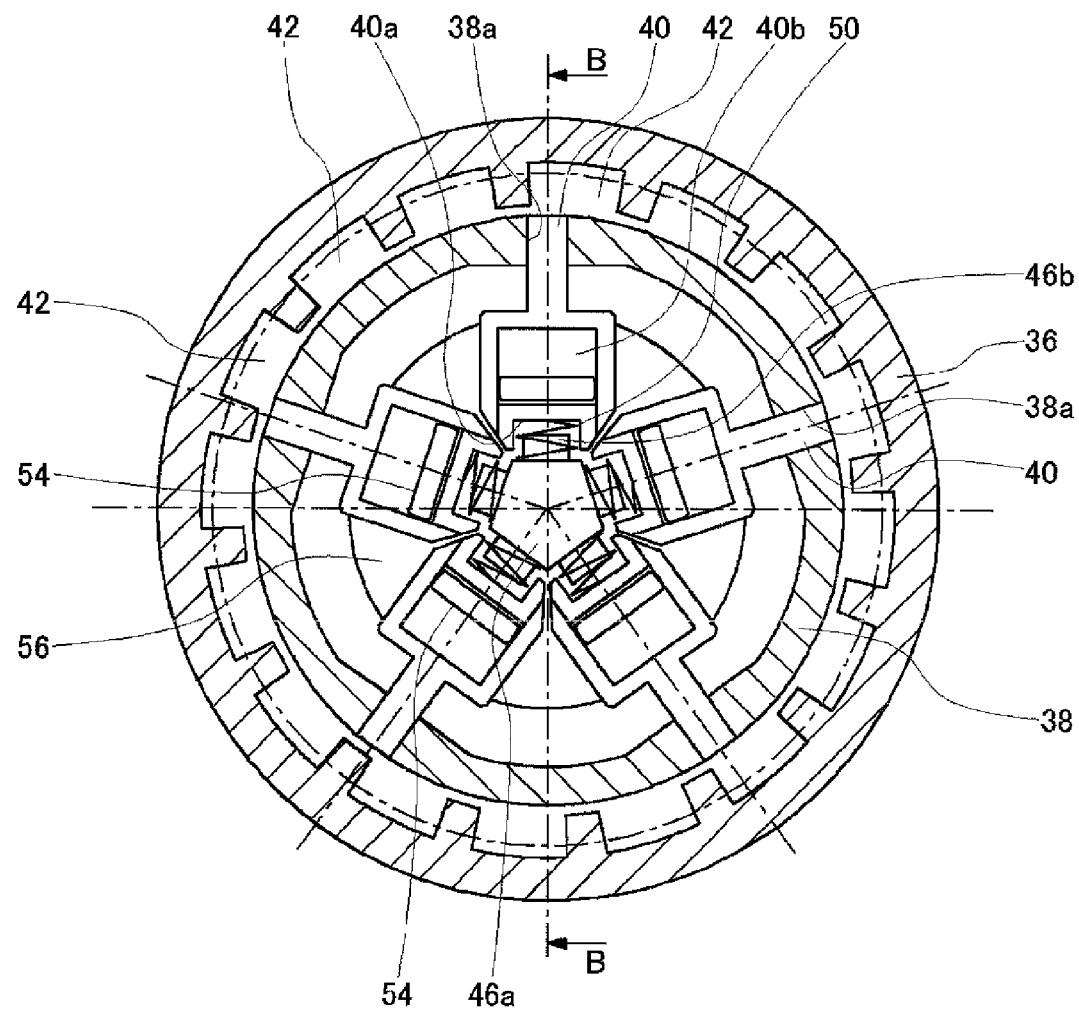
FIG. 3 is an A-A sectional view of the clutch device illustrated in FIG. 2.

Subsequently, the structure of the clutch device 29 will be described in detail. FIG. 2 is a sectional view parallel to the shaft of the clutch device 29 according to First Embodiment. FIG. 3 is an A-A sectional view of the clutch device 29 illustrated in FIG. 2. Herein, FIG. 2 illustrates the B-B section illustrated in FIG. 3.

The clutch device 29 includes: an annular handle-side housing 36 that is a first rotating shaft; an annular tire-side housing 38 that is a second rotating shaft; and a plurality of lock bars 40 as engaging parts that are provided in the tire-side housing 38 so as to be capable of moving in the radial direction of the tire-side housing 38. In the handle-side housing 36, a plurality of lock grooves 42 are formed to be spaced apart from each other in the inner circumferential surface and in the circumferential direction. The tire-side housing 38 is provided to be coaxial with the handle-side housing 36 and arranged such that at least part thereof overlaps the handle-side housing 36 when viewed from the side of the clutch device 29.

The handle-side housing 36 is coupled to the steering actuator 30 so as to be rotated with the rotation of the handle 12. The tire-side housing 38 is coupled to the turning actuator 32 so as to be rotated with the turn of the tire. The clutch device 29 further includes an advancing/retracting mechanism 44 that causes the lock bars 40 to advance and retract in the direction toward the lock grooves 42. Details of the advancing/retracting mechanism 44 will be described later.

In the clutch device 29 according to the present embodiment, five lock bars 40 are radially arranged at almost equal intervals. Each lock bar 40 is slidably supported by an opening 38a formed in the circumferential surface of the annular tire-side housing 38.

A spring receiving member 46 is fixed near an opening on the right side of the tire-side housing 38, the opening being illustrated in FIG. 2. In the spring receiving member 46, a plurality of convex portions 46b are radially arranged at almost equal intervals on the outer circumferential surface of a small-diameter portion 46a so as to correspond to the respective lock bars 40. The convex portion 46b supports one end of a spring 50, a biasing member, so that the spring 50 is not shifted. The other end of the spring 50 is supported by a concave portion 40a formed in a portion facing to the spring receiving member 46 for the lock bar 40. The spring 50 is compressed in the states illustrated in FIGS. 2 and 3.

The advancing/retracting mechanism 44 has: a pull type solenoid 52 as an actuator driven by electricity; the spring 50 for biasing the lock bar 40 toward the lock groove 42; a pin 54 that controls the advancement/retraction of the lock bar 40 by acting thereon; and an adapter 56 to which the pin 54 is fixed.

The pull type solenoid 52 is configured such that: when powered (clutch device is an OFF state), a shaft 52a is retracted; and when not powered (clutch device is in an ON state), the shaft 52a is protruded by the action of a return spring located inside. FIG. 2 illustrates a state where the pull type solenoid 52 is powered.

The pin 54 engages the lock bar 40 in a state of entering a through-hole 40b provided in the central portion of the lock bar 40. The pin 54 has: a first engaging part 54a that contacts the through-hole 40b of the lock bar 40 when the clutch device is in the OFF state illustrated in FIG. 2; a second engaging part 54b that contacts the through-hole 40b of the lock bar 40 when the clutch device is in the later-described ON state; and an inclined surface 54c that smoothly joins the first engaging part 54a and the second engaging part 54b. The pin 54 is bent so as to gradually approach a rotational axis Ax of the clutch device 29 toward the first engaging part 54a from the second engaging part 54b. Herein, the second engaging part 54b may not necessarily contact the inner circumferential wall of the through-hole 40b.

The adapter 56 is fixed to the shaft of the pull type solenoid 52, and the position thereof is changed in the shaft direction in accordance with the state of the power supply to the pull type solenoid 52. At the time, the position of the pin 54 is also changed in the shaft direction.

Subsequently, the movements of the clutch device will is be described. When the clutch device 29 is in an OFF state, namely, when the pull type solenoid 52 is powered, as illustrated in FIGS. 2 and 3, the lock bars 40 never contact the lock grooves 42. Accordingly, the steering actuator 30 and the turning actuator 32 are in a state where they are disconnected from each other, and rotational force is not transmitted between them.

In more detail, when the pull type solenoid 52 is powered, the adapter 56 is retracted along with the shaft of the pull type solenoid 52. At the time, the first engaging part 54a of the pin 54 contacts the inner circumferential wall of the through-hole 40b, so that the lock bar 40 is regulated at a position where the clutch device 29 is in an OFF state.

Figure 4:
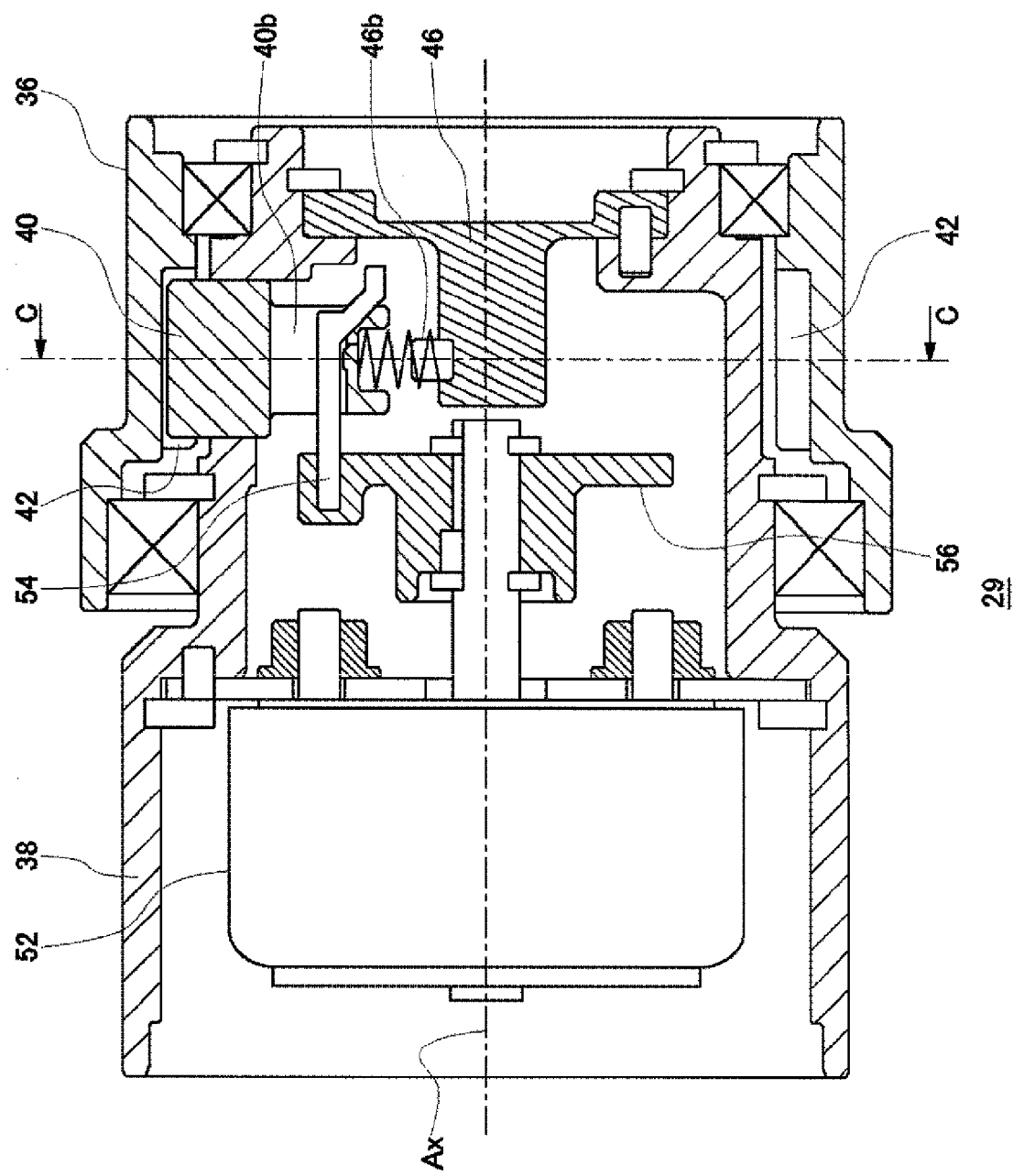
FIG. 4 is a sectional view parallel to the shaft of the clutch device (clutch ON state) according to First Embodiment.
Figure 5:
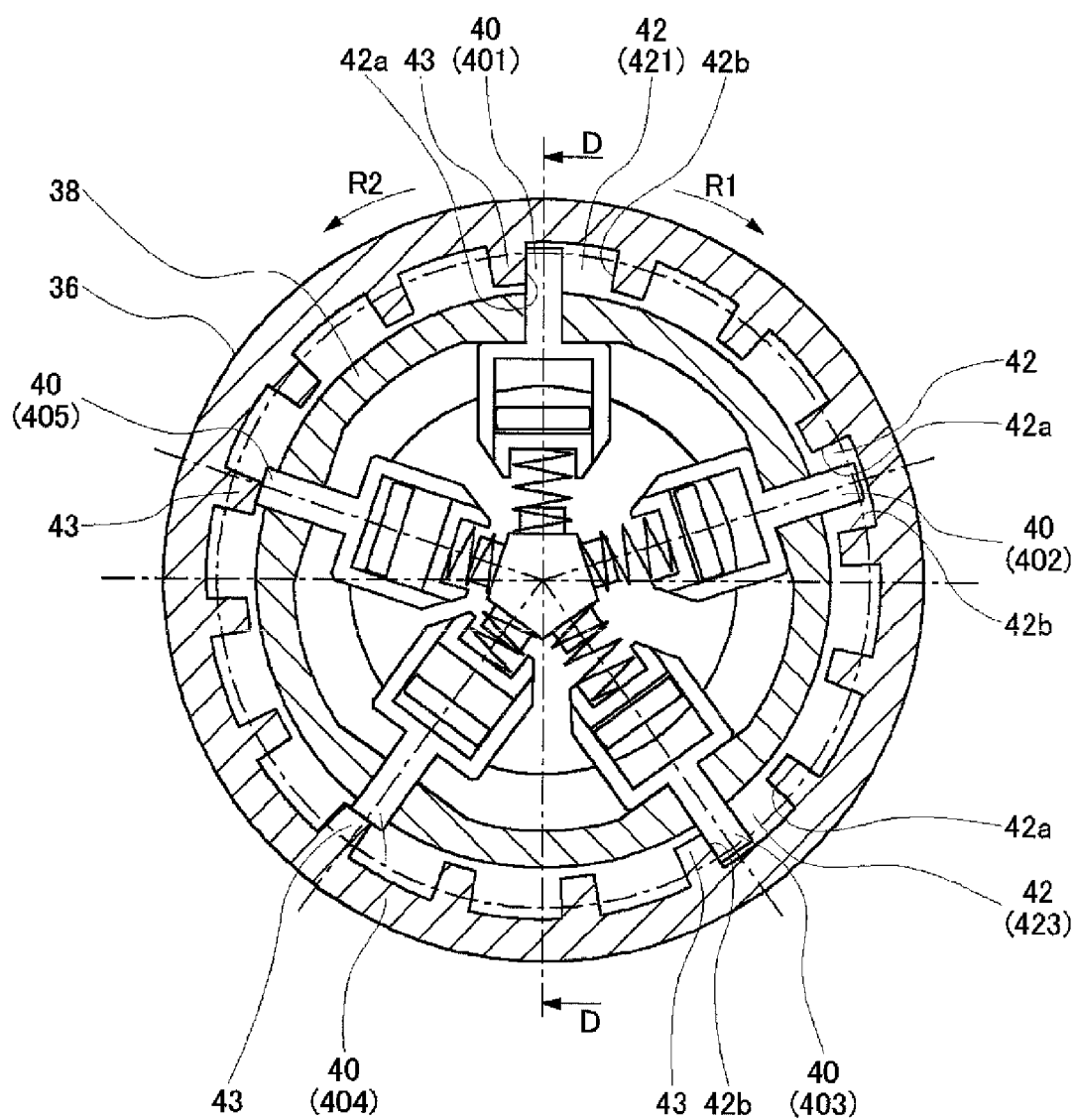
FIG. 5 is a C-C sectional view of the clutch device illustrated in FIG. 4.

FIG. 4 is a sectional view parallel to the shaft of the clutch device 29 (clutch ON state) according to First Embodiment. FIG. 5 is a C-C sectional view of the clutch device 29 illustrated in FIG. 4. Herein, FIG. 4 illustrates the D-D section illustrated in FIG. 5.

When the clutch device 29 is in a non-powered state where the power supply thereto is stopped due to a failure of the system, etc., the adapter 56, which has been retracted until then, moves in the right direction illustrated in FIG. 4 by the action of the return spring in the pull type solenoid 52. As a result, the position of the pin 54 is changed inside the through-hole 40b of the lock bar 40, so that the second engaging part 54b of the pin 54 is located inside the through-hole 40b. As a result, the lock bar 40, the position of which has been regulated by the pin 54, can move toward the lock groove 42 of the handle-side housing 36.

Thus, each lock bar 40 is applied with force by the biasing force of the spring 50, by the force the lock bar 40 moving in the radial direction of the tire-side housing 38 toward the lock groove 42 of the handle-side housing 36, but the clutch device 29 is not so configured that all of the lock bars 40 enter the lock grooves 42 as they are, as illustrated in FIG. 5.

That is, various combinations of the lock bars that enter the lock grooves 42 can be possible depending on the positional relationship between the respective lock bars 40 (hereinafter, sometimes and appropriately referred to as lock bars 401 to 405) and the respective lock grooves 42, namely, the positional relationship between the handle-side housing 36 and the tire-side housing 38. In the clutch device 29 illustrated in FIG. 5, the lock bars 401 to 403 that enter the lock grooves 42 and the lock bars 404 and 405 that do not enter the lock grooves 42 and contact protruding portions 43 each located between the adjacent lock grooves 42 are present.

The state illustrated in FIG. 5 is obtained when the clutch device 29 is completely in a clutch ON state, but this state is not always obtained simultaneously when the power supply to the pull type solenoid 52 is stopped. Hereinafter, the movements, occurring before the clutch device 29 is completely in a clutch ON state by a normal operation of the handle 12, will be further described in detail.

Figure 13:
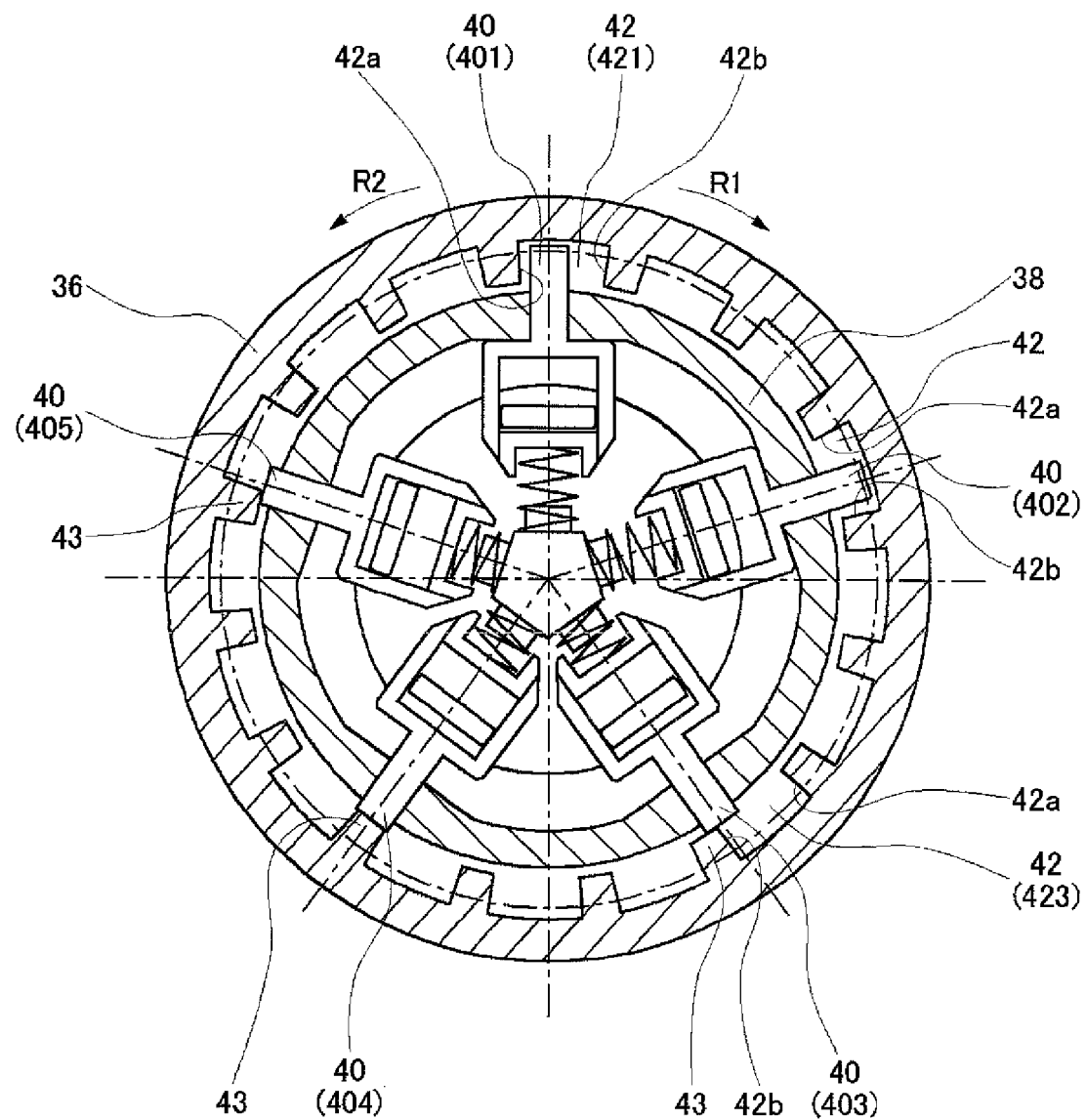
FIG. 13 is a sectional view of the clutch device located at a position where a handle-side housing has been slightly rotated in the arrow R2 direction from the state illustrated in FIG. 5.

FIG. 13 is a sectional view of the clutch device located at a position where the handle-side housing 36 has been slightly rotated in the arrow R2 direction from the state illustrated in FIG. 5. For example, when the handle-side housing 36 is located at a position where it has been slightly rotated in the arrow R2 direction from the state illustrated in FIG. 5 (the tire-side housing 38 is still in the state illustrated in FIG. 5), the lock bars 401 and 402 enter the lock grooves 42, but the lock bars 403, 404, and 405 are in the state of contacting the protruding portions 43 located on the inner circumferential wall of the handle-side housing 36. In this case, each of the lock bars 401 and 402, which has entered the lock groove 42, does not contact the side surfaces 42a and 42b of the lock groove 42. Accordingly, play exists in the rotational direction between the handle-side housing 36 and the tire-side housing 38.

When the handle-side housing 36 is rotated in the arrow R1 direction from this state, the lock bar 403 enters the lock groove 42 upon the lock bar 401 contacting and engaging one side surface 42a of the lock groove 42, thereby allowing the lock bar 403 to engage the other side surface 42b of the lock groove 42. As a result, play is almost eliminated in the rotational direction between the handle-side housing 36 and the tire-side housing 38 (lock state) by the lock bar 401 that has entered the lock groove 421 to engage the one side surface 42a and the lock bar 403 that has entered the lock groove 423 to engage the other side surface 42b, as illustrated in FIG. 5, thereby allowing the rotational force of the handle-side housing 36 to be surely transmitted to the tire-side housing 38.

Thus, in the clutch device 29 according to the present embodiment, the plurality of lock bars 40 have: the lock bar 401 that enters the lock groove 421, any one first groove portion of the plurality of lock grooves 42, when the plurality of lock bars 40 are moved toward the plurality of lock grooves 42 by the advancing/retracting mechanism 44 including the pull type solenoid 52, irrespective of a rotational phase difference between the handle-side housing 36 and the tire-side housing 38; and the lock bar 403 that enters the lock groove 423 as a second groove portion different from the lock groove 421, when the lock bar 401 moves in the counter-clockwise direction (arrow R2 direction illustrated in FIG. 13) in a state of entering the lock groove 421 and engages the side surface 42a of the two side surfaces 42a and 42b of the lock groove 421, the side surface 42a being located on one rotational direction (arrow R2 direction) side. The lock bar 403 is configured such that, when entering the lock groove 423, it engages the side surface 42b of the two side surfaces 42a and 42b of the lock groove 423, the side surface 42b being located on the other rotational direction (arrow R1 direction) side.

Thereby, the clutch device 29 can cause the vehicle steering device 10 to be in a separation state with each lock bar 40 being caused to retract from the lock groove 42 by the advancing/retracting mechanism 44, in which rotational force is not transmitted between the handle-side housing 36 and the tire-side housing 38. On the other hand, in the state (lock state) where the handle-side housing 36 and the tire-side housing 38 are connected together by the advancing/retracting mechanism 44, the clutch device 29 can transmit rotational force to the tire-side housing 38 in a state where there is little play, because the lock bar 401 engages the side surface 42a of the two side surfaces of the lock groove 421, the side surface 42a being located on the other rotational direction (arrow R2 direction) side, when the handle-side housing 36 is rotated in one rotational direction (e.g., arrow R1 direction). Alternatively, when the handle-side housing 36 is rotated in the other rotational direction (e.g., arrow R2 direction), the lock bar 403 engages the side surface 42b of the two side surfaces of the lock groove 423, the side surface 42b being located on the one rotational direction (arrow R1 direction) side, and hence rotational force can be transmitted to the tire-side housing 38 in a state where there is little play.

Additionally, the clutch device 29 is configured such that: the lock bar 40 is retracted from the lock groove 42 with force larger than the biasing force of the spring 50 by the movement occurring when the pull type solenoid 52 is powered; and when the power supply to the pull type solenoid 52 is stopped, the lock bars 402 and 403 enter the lock grooves 42 by the biasing force of the spring 50. Thereby, in an emergency when the power supply to the pull type solenoid 52 is stopped, the handle-side housing 36 and the tire-side housing 38 are instantly connected together with the lock bars 402 and 403 entering the lock grooves 42.

Figure 6:
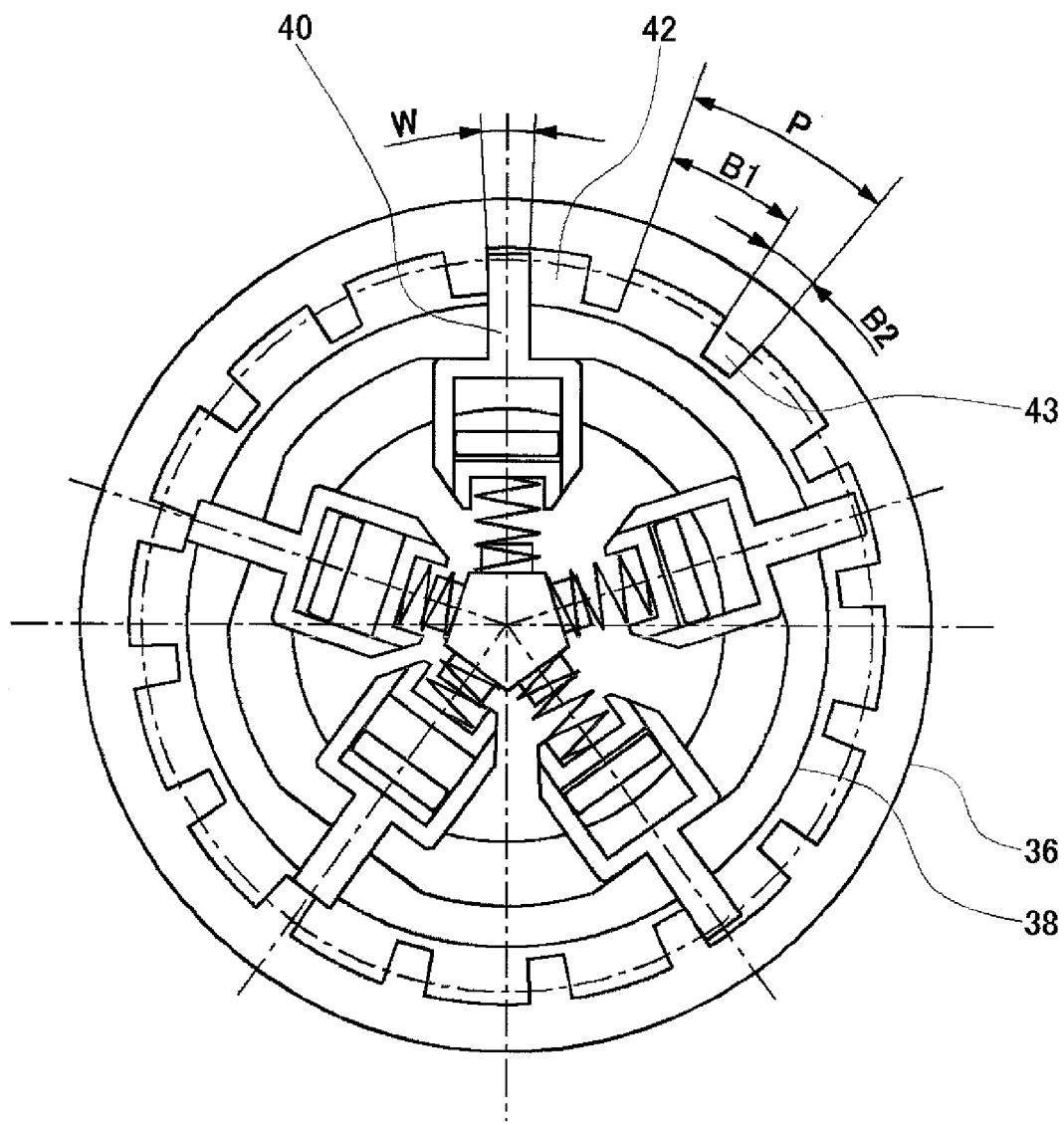
FIG. 6 is a view for explaining shapes of a lock bar and a lock groove.
Figure 7:
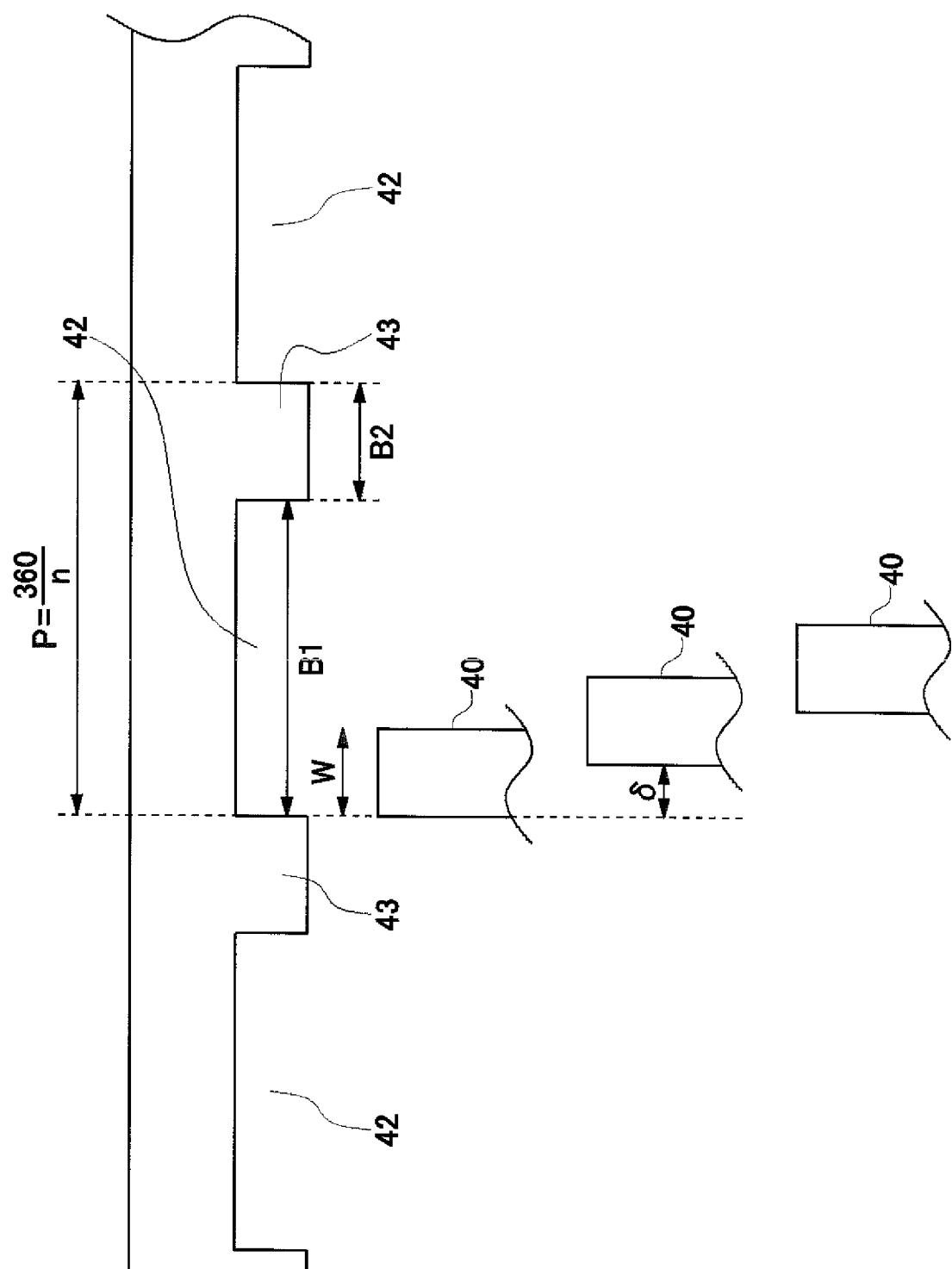
FIG. 7 is a schematic view linearly illustrating the relationship between the lock bar and the lock groove illustrated in FIG. 6.

Subsequently, the preferred relationship between the lock bar 40 and the lock groove 42 will be described. FIG. 6 is a view for explaining the shapes of the lock bar 40 and the lock groove 42. FIG. 7 is a schematic view linearly illustrating the relationship between the lock bar and the lock groove illustrated in FIG. 6.

As illustrated in FIGS. 6 and 7, it is assumed that: the number of the plurality of lock grooves 42 is n [piece], the pitch of the lock grooves 42 is P, the number of the plurality of lock bars 40 is N [piece], the number of the lock bars 40 that enter the plurality of lock grooves 42 is Nx [piece], the width of the lock bar 40 is W [deg], the width of the lock groove 42 is B1 [deg], the distance between the adjacent lock grooves 42 (width of the protruding portion 43) is B2 [deg], and a gap angle occurring when the lock bar 40 is engaged with the lock groove 42 (gap angle upon connection) is δ [deg], the respective parameters in the clutch device 29 according to the present embodiment are set as shown in Table 1.

TABLE 1

|  | The Number of Lock Bars N[piece] | The Number of Lock Bars that can Enter Grooves Nx[piece] | Gap Angle upon Connection δ [deg] | Width of Lock Bar W[deg] | The Number of Lock Grooves n[piece] | Pitch of Lock Grooves P[deg] | Width of Lock Groove B1[deg] | Width of Protruding Portion B2[deg] |
|---|---|---|---|---|---|---|---|---|
| First Embodiment | 5 | 3 | 4.5 | 7 | 16 | 22.5 | 16 | 6.5 |
| Second Embodiment | 5 | 2 | 4.5 | 9 | 16 | 22.5 | 13.5 | 9 |
| Third Embodiment | 4 | 2 | 4.74 | 7.11 | 19 | 18.95 | 11.84 | 7.11 |

The respective parameters are set to satisfy the following equations:

$$P = 360/n \quad \text{Equation (1)}$$

$$B1 \approx W + (\delta \times (Nx - 1)) \quad \text{Equation (2)}$$

$$\delta = P/N \quad \text{Equation (3)}$$

The values for the respective equations may have some errors due to the flexibility in design and the tolerance of parts, etc.

Thereby, in any case of the relative phase between the handle-side housing 36 and the tire-side housing 38, at least one lock bar 40 is always located at a position where it can enter the lock groove 42. Design can be achieved, in which the gap angle δ, occurring when the handle-side housing 36 and the tire-side housing 38 are connected (locked) together, is taken into consideration. Herein, the gap angle δ upon connection means a parameter representing an angle at which, in any case of the relative phase between the handle-side housing 36 and the tire-side housing 38, a clutch ON state (lock state) can be achieved in the clutch device 29 by rotating one of the two housings by the gap angle δ upon connection with respect to the other. That is, when the gap angle δ upon connection is set to be small, the steering actuator 30 and the turning actuator 32 are mechanically coupled together by a slight handle operation even if the system is in a failure state, thereby allowing the fail-safe response of the vehicle steering device 10 to be improved.

As described above, the vehicle steering device 10 includes: the handle 12 that is rotated for steering a vehicle; the steering angle sensor 14 that detects information in accordance with an operation amount of the handle 12; the rack and pinion mechanism 34 that turns the tire 26; the turning motor 24 that drives the rack and pinion mechanism 34; the clutch device 29 that is arranged between the handle 12 and the rack and pinion mechanism 34 and switches transmission and cutoff of the rotational force between the handle 12 and the rack and pinion mechanism 34; and the ECU 28 that drives the turning motor in a state where the rotational force is cut off by the clutch device 29 and that controls a turning amount based on information in accordance with the operation amount. The handle 12 is coupled to the handle-side housing 36, the rack and pinion mechanism 34 is coupled to the tire-side housing 38, and the clutch device 29 is configured in the following way: the handle-side housing 36 and the tire-side housing 38 are mechanically coupled together such that a steering angle of the wheel is changed in accordance with an operation of the handle 12 in a state where the rotational force between the handle 12 and the rack and pinion mechanism 34 can be transmitted.

Thereby, when the turning motor 24 is driven in a state where the rotational force is cut off by the clutch device 29 and a turning amount is controlled based on information in accordance with an operation amount of the handle 12, a torque variation, etc., is not transmitted from the rack and pinion mechanism 34 to the handle 12, and hence a steering feeling can be improved.

(Second Embodiment)

Figure 8:
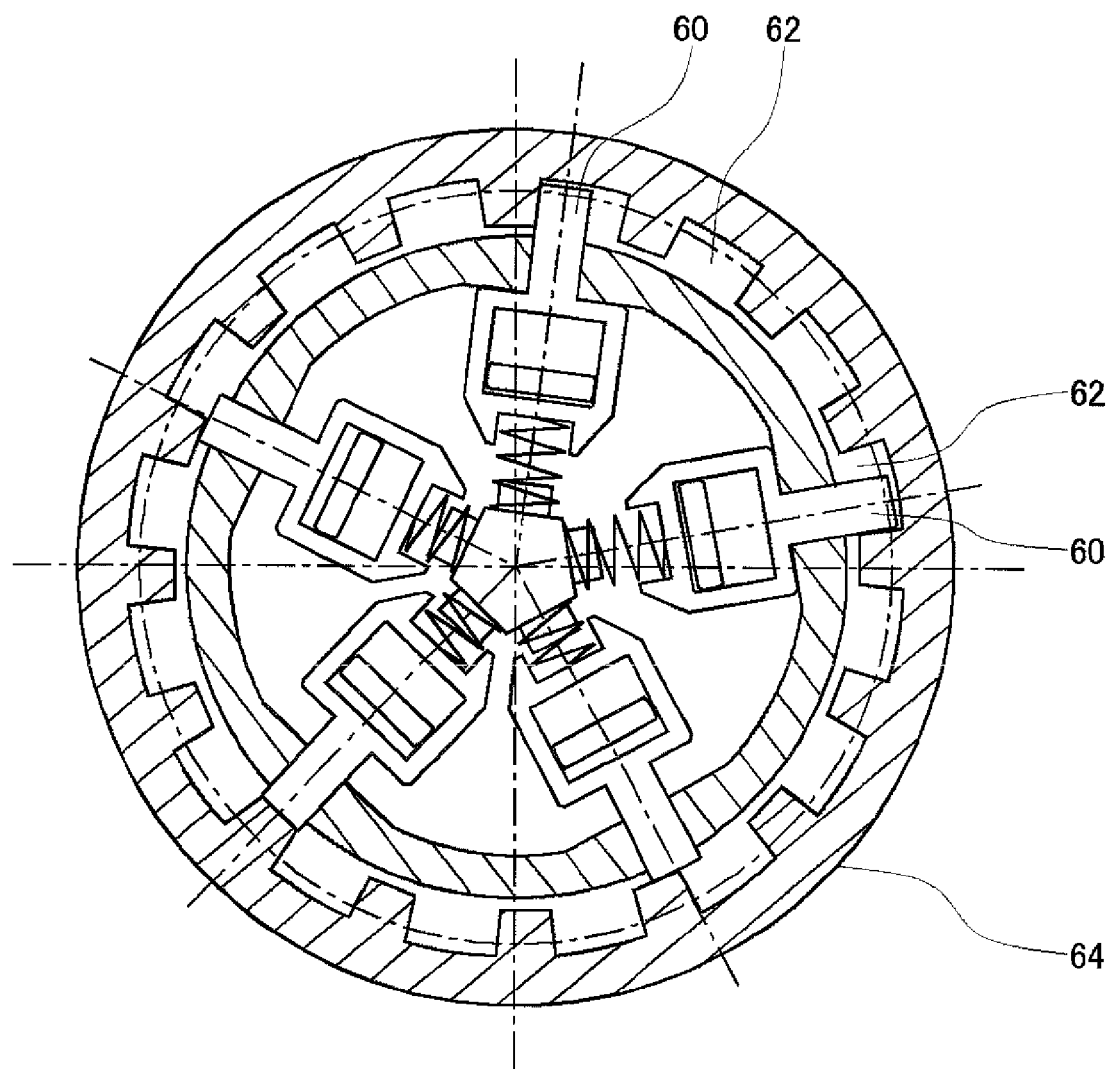
FIG. 8 is a sectional view of a clutch device according to Second Embodiment.

FIG. 8 is a sectional view of a clutch device according to Second Embodiment. A clutch device 58 illustrated in FIG. 8 is very characteristic in that the sizes of a lock bar and a lock groove are different from those in the clutch device 29 according to First Embodiment. Because the structure and movements of the clutch device 58 itself are almost the same as those of the clutch device 29 according to First Embodiment, description thereof will be appropriately omitted.

Various parameters with respect to a lock bar 60 and a lock groove 62 in the clutch device 58 are the same as shown in Table 1. In comparison with the clutch device 29, the width of the lock bar 40 is larger and that of the lock groove 62 is smaller in the clutch device 58. Additionally, of the five lock bars 60, the number of the lock bars that surely enter any lock grooves 62 is one, when the power supply to the pull type solenoid 52 is stopped (in the clutch device 29 according to First Embodiment, the number thereof is two).

And while the handle-side housing 64 is being rotated by up to the gap angle δ upon connection from this state, another lock bar 60 enters the lock groove 62. Thereby, the same operation effects as those in the clutch device 29 according to First Embodiment can be obtained.

(Third Embodiment)

Figure 9:
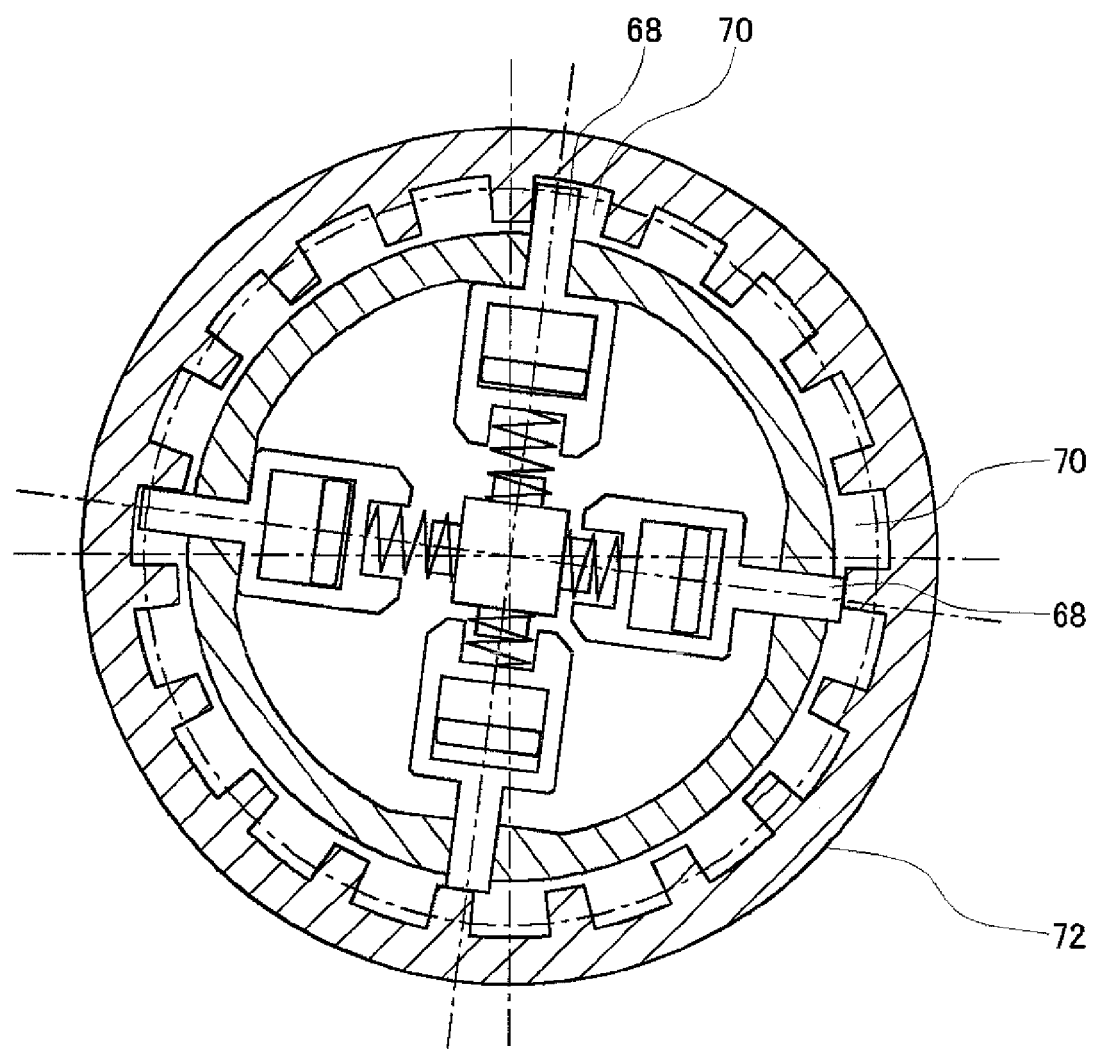
FIG. 9 is a sectional view of a clutch device according to Third Embodiment.

FIG. 9 is a sectional view of a clutch device according to Third Embodiment. A clutch device 66 illustrated in FIG. 9 is very characteristic in that the numbers of lock bars and lock grooves are different from those in the clutch device 29 according to First Embodiment and the clutch device 58 according to Second Embodiment. Because the structure and movements of the clutch device 66 itself are almost the same as those of the clutch device 29 according to First Embodiment, description thereof will be appropriately omitted.

Various parameters with respect to a lock bar 68 and a lock groove 70 in the clutch device 66 are the same as shown in Table 1. In comparison with the clutch devices 29 and 58, the number of the lock bars 68 is smaller and that of the lock grooves 70 is larger in the clutch device 66. Additionally, of the four lock bars 68, the number of the lock bars that surely enter any lock grooves 70 is one, when the power supply to the pull type solenoid 52 is stopped (in the clutch device 29 according to First Embodiment, the number thereof is two).

And while the handle-side housing 72 is being rotated by up to the gap angle δ upon connection from this state, another lock bar 68 enters the lock groove 70. Thereby, the same operation effects as those in the clutch device 29 according to First Embodiment can be obtained.

(Fourth Embodiment)

Figure 10:
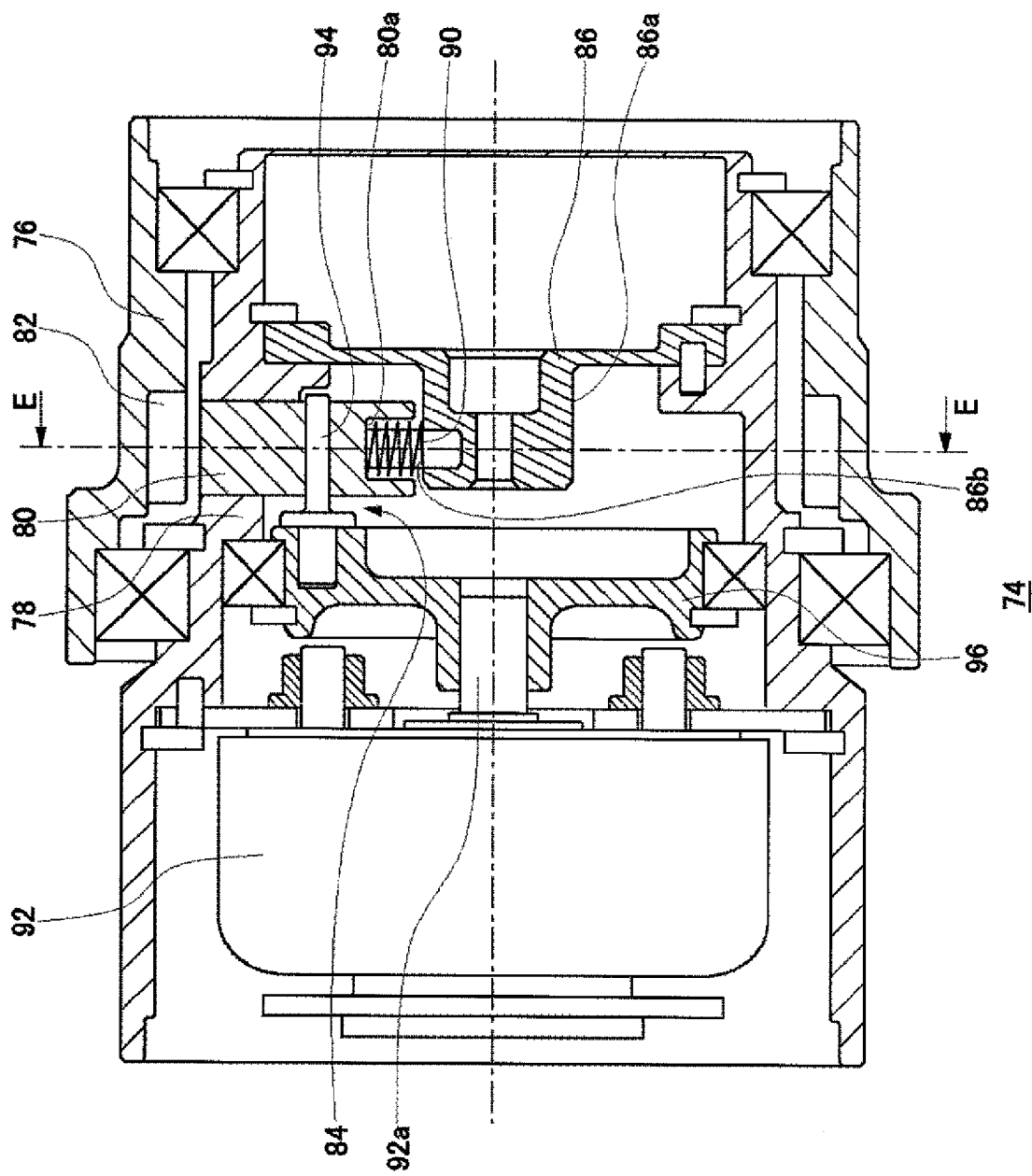
FIG. 10 is a sectional view parallel to the shaft of a clutch device according to Fourth Embodiment.
Figure 11:
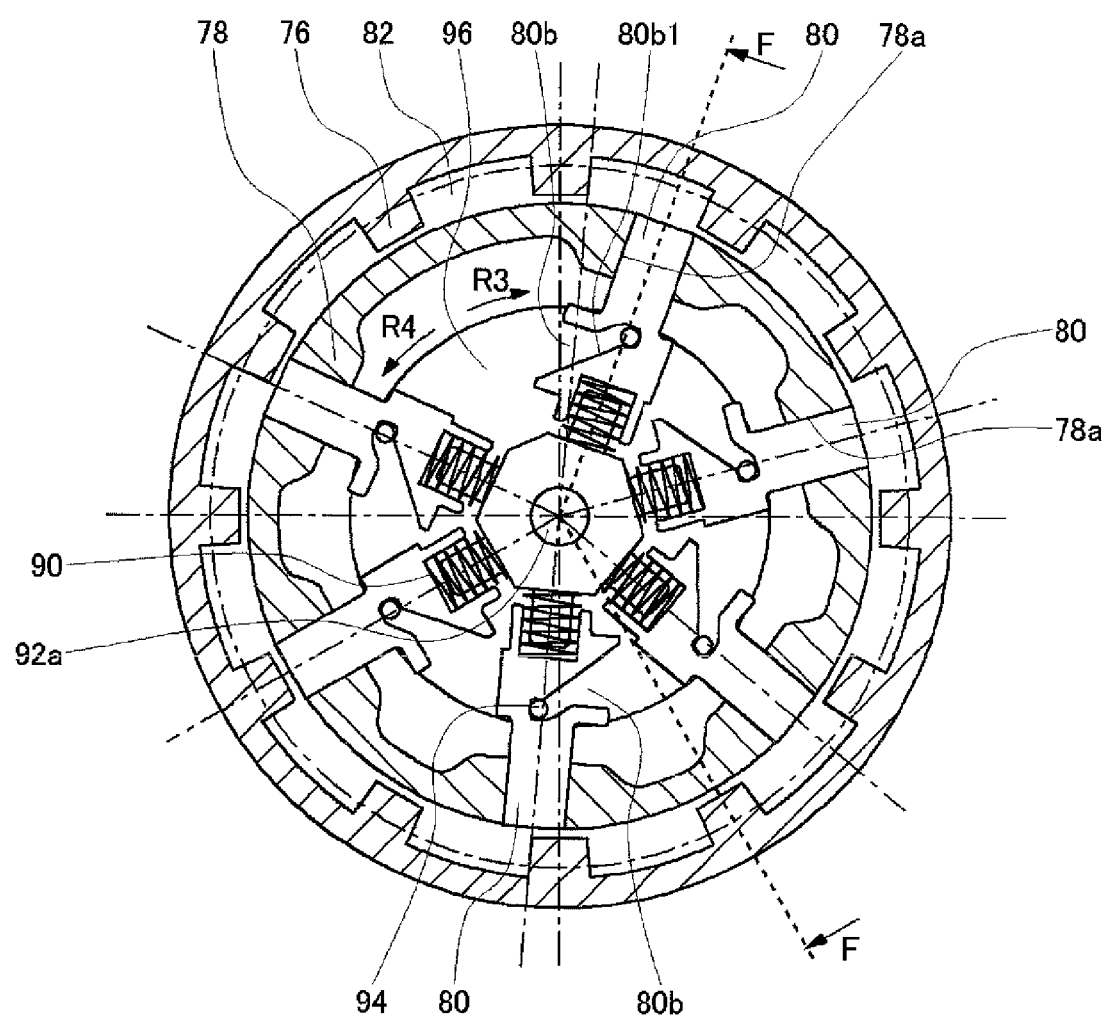
FIG. 11 is an E-E sectional view of the clutch device illustrated in FIG. 10.

FIG. 10 is a sectional view parallel to the shaft of a clutch device 74 according to Fourth Embodiment. FIG. 11 is an E-E sectional view of the clutch device 74 illustrated in FIG. 10. Herein, FIG. 10 illustrates the F-F section illustrated in FIG. 11.

The clutch device 74 according to the present embodiment is very different from the clutch device 29 according to First Embodiment in that: a rotary type solenoid is included as an actuator; and an advancing/retracting mechanism includes a conversion mechanism that causes a lock bar to advance and retract by converting a rotational movement of the rotary type solenoid.

The clutch device 74 includes: an annular handle-side housing 76 that is a first rotating shaft; an annular tire-side housing 78 that is a second rotating shaft; and a plurality of lock bars 80 as engaging parts that are provided in the tire-side housing 78 so as to be capable of moving in the radial direction of the tire-side housing 78. In the handle-side housing 76, a plurality of lock grooves 82 are formed to be spaced apart from each other in the inner circumferential surface and in the circumferential direction. The tire-side housing 78 is provided to be coaxial with the handle-side housing 76 and arranged such that at least part thereof overlaps the handle-side housing 76 when viewed from the side of the clutch device 74.

The handle-side housing 76 is coupled to the steering actuator 30 (see FIG. 1) so as to be rotated with the rotation of the handle 12. The tire-side housing 78 is coupled to the turning actuator 32 (see FIG. 1) so as to be rotated with the turn of the tire. The clutch device 74 further includes an advancing/retracting mechanism 84 that causes the lock bars 80 to advance and retract in the direction in the direction toward the lock grooves 82. Details of the advancing/retracting mechanism 84 will be described later.

In the clutch device 74 according to the present embodiment, six lock bars are radially arranged. Each lock bar 80 is slidably supported by an opening 78a formed in the circumferential surface of the annular tire-side housing 78.

A spring receiving member 86 is fixed near an opening on the right side of the tire-side housing 78, the opening being illustrated in FIG. 10. In the spring receiving member 86, a plurality of convex portions 86b are radially arranged on the outer circumferential surface of a small-diameter portion 86a so as to correspond to the respective lock bars 80. The convex portion 86b supports one end of a spring, a biasing member, so that the spring is not shifted. The other end of the spring 90 is supported by a concave portion 80a formed in a portion corresponding to the spring receiving member 86 for the lock bar 80. The spring 90 is compressed in the states illustrated in FIGS. 10 and 11.

The advancing/retracting mechanism 84 has: a rotary type solenoid 92 as an actuator driven by electricity; the spring 90 for biasing the lock bar 80 toward the lock groove 82; a pin 94 that controls the advancement/retraction of the lock bar 80 by acting thereon; and a turntable 96 to which the pin 94 is fixed.

The rotary type solenoid 92 is configured such that: when powered (clutch device is in an OFF state), a shaft 92a is rotated in the arrow R3 direction illustrated in FIG. 11; and when not powered (clutch device is in an ON state), the shaft 92a is rotated in the arrow R4 direction illustrated in FIG. 11 by the action of a return spring located inside. FIG. 10 illustrates a state where the rotary type solenoid 92 is powered.

The pin 94 engages the lock bar 80 in a state of entering a notch groove 80b provided from the central portion toward the side surface of the lock bar 80. The pin 94 contacts the notch groove 80b of the lock bar 80 in the state illustrated in FIG. 10 where the clutch device is in an OFF state, and retracts from the notch groove 80b of the lock bar 80 in the later-described state where the clutch device is in an ON state.

The turntable 96 is fixed to the shaft 92a of the rotary type solenoid 92, and is rotated in the clockwise or counter-clockwise direction in accordance with the state of power supply to the rotary type solenoid 92. At the time, the pin 94 is also rotated in the clockwise or counter-clockwise direction, so that the position thereof is changed.

Subsequently, the movements of the clutch device will be described. When the clutch device 74 is in an OFF state, namely, when the rotary type solenoid 92 is powered, as illustrated in FIGS. 10 and 11, the lock bars 80 never contact the lock grooves 82. Accordingly, the steering actuator 30 (see FIG. 1) and the turning actuator 32 (see FIG. 1) are in a state where they are disconnected from each other, and rotational force is not transmitted between them.

In more detail, when the rotary type solenoid 92 is powered, the turntable 96 is rotated in the arrow R3 direction illustrated in FIG. 11 along with the shaft 92a of the rotary type solenoid 92. At the time, the pin 94 enters the back side of the notch groove 80b while contacting a side wall 80b1 of the notch groove 80b, and hence the lock bar 80 is gradually drawn into the inside of the tire-side housing 78, so that the lock bar 80 is finally regulated at a position where the clutch device 74 is in an OFF state.

Figure 12:
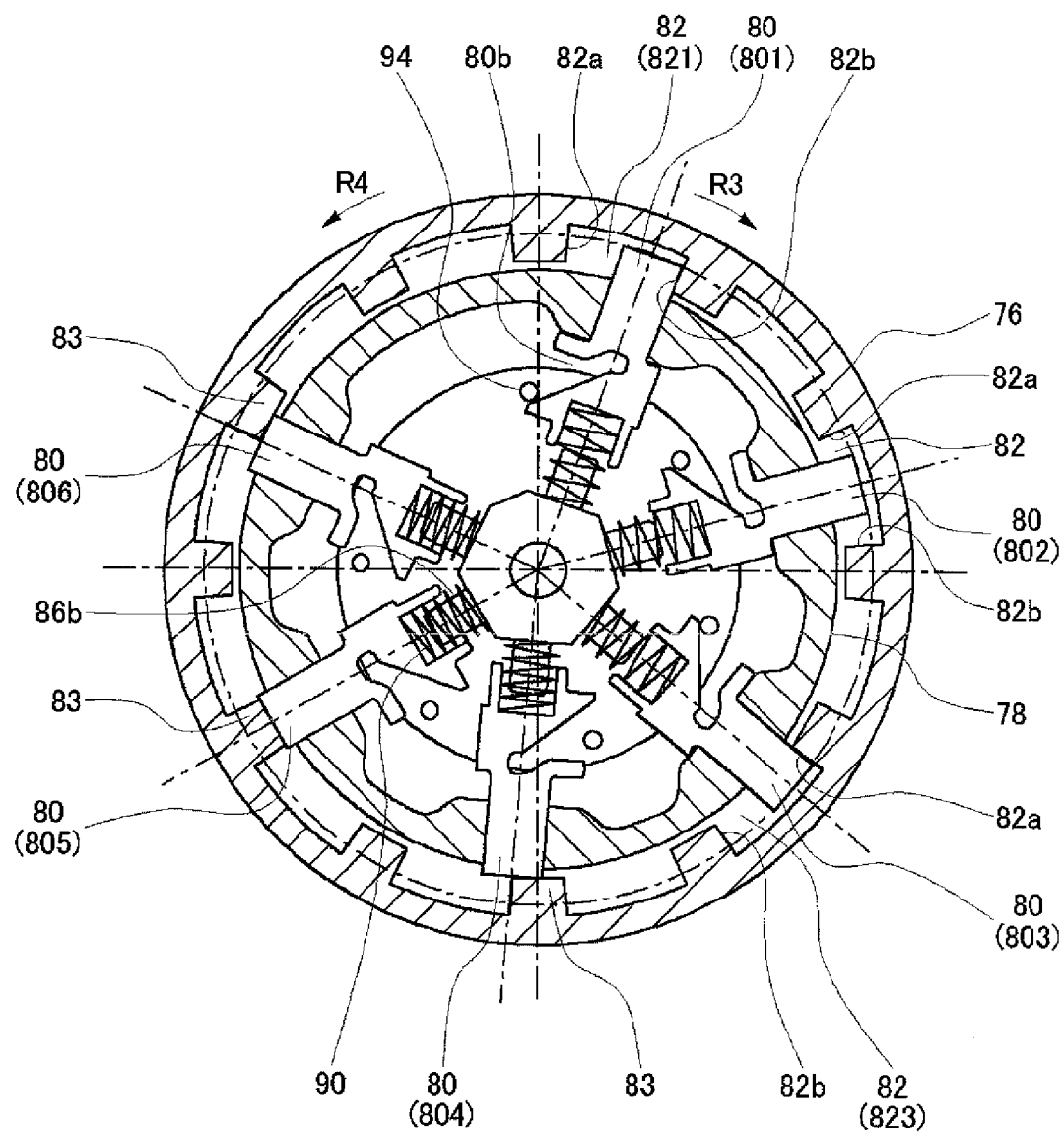
FIG. 12 is a sectional view perpendicular to the shaft of the clutch device (clutch ON state) according to Fourth Embodiment.

FIG. 12 is a sectional view perpendicular to the shaft of the clutch device 74 (clutch ON state) according to Fourth Embodiment.

When power supply is stopped due to a failure of the system, etc., in the clutch device 74, the turntable 96, which has regulated the lock bars 80 until then, is rotated in the arrow R4 direction illustrated in FIG. 12 by the action of the return spring in the rotary type solenoid 92. As a result, the position of the pin 94 is changed inside the notch groove 80b of the lock bar 80, so that the pin 94 retracts from the inside of the notch groove 80b. As a result, the lock bar 80, the position of which has been regulated by the pin 94, can move toward the lock groove 82 of the handle-side housing 76.

Thus, each lock bar 80 is applied with force by the biasing force of the spring 90, by the force the lock bar 80 moving in the radial direction of the tire-side housing 78 toward the lock groove 82 of the handle-side housing 76, but the clutch device 74 is not so configured that all of the lock bars 80 enter the lock grooves 82 as they are, as illustrated in FIG. 12.

That is, various combinations of the lock bars that enter the lock grooves 82 can be possible depending on the positional relationship between the respective lock bars 80 (hereinafter, sometimes and appropriately referred to as lock bars 801 to 806) and the respective lock grooves 82, namely, the positional relationship between the handle-side housing 76 and the tire-side housing 78. In the clutch device 74 illustrated in FIG. 12, the lock bars 801 to 803 that enter the lock grooves 82 and the lock bars 804 to 806 that do not enter the lock grooves 82 and contact protruding portions 83 each located between the adjacent lock grooves 82 are present.

The state illustrated in FIG. 12 is obtained when the clutch device 74 is completely in a clutch ON state, but this state is not always obtained simultaneously when the power supply to the rotary type solenoid 92 is stopped. Hereinafter, the movements, occurring before the clutch device 74 is completely in a clutch ON state by a normal operation of the handle 12, will be further described in detail.

For example, when the handle-side housing 76 is located at a position where it has been slightly rotated in the arrow R4 direction from the state illustrated in FIG. 12 (the tire-side housing 38 is still in the state illustrated in FIG. 12), the lock bars 802 and 803 enter the lock grooves 82, but the lock bars 801 and 804 to 806 are in the state of contacting the protruding portions 83 located on the inner circumferential wall of the handle-side housing 76. In this case, each of the lock bars 802 and 803, which has entered the lock groove 82, does not contact the side surfaces 82a and 82b of the lock groove 82.

Accordingly, play exists in the rotational direction between the handle-side housing 76 and the tire-side housing 78.

When the handle-side housing 76 is then rotated in the arrow R3 direction from this state, the lock bar 801 enters the lock groove 82 upon the lock bar 803 contacting and engaging one side surface 82a of the lock groove 82, thereby allowing the lock bar 801 to engage the other side surface 82b of the lock groove 82. As a result, play is almost eliminated in the rotational direction between the handle-side housing 76 and the tire-side housing 78 (lock state) by the lock bar 801 that enters the lock groove 821 to engage the other side surface 82b and the lock bar 803 that enters the lock groove 823 to engage the one side surface 82a, as illustrated in FIG. 12, thereby allowing the rotational force of the handle-side housing 76 to be surely transmitted to the tire-side housing 78.

Thus, in the clutch device 74 according to the present embodiment, the plurality of lock bars 80 have: the lock bar 803 that enters the lock groove 823, any one first groove portion of the plurality of lock grooves 82, when the plurality of lock bars 80 are moved toward the plurality of lock grooves 82 by the advancing/retracting mechanism 84 including the rotary type solenoid 92, irrespective of a rotational phase difference between the handle-side housing 76 and the tire-side housing 78; and the lock bar 801 that enters the lock groove 821 as a second groove portion different from the lock groove 823, when the lock bar 401 moves in the counter-clockwise direction (arrow R4 direction illustrated in FIG. 12) in a state where the lock bar 803 enters the lock groove 823 and the lock bar 401 engages the side surface 82a of the two side surfaces 82a and 82b of the lock groove 823, the side surface 82a being located on one rotational direction (arrow R4 direction) side. The lock bar 801 is configured such that, when entering the lock groove 821, it engages the side surface 82b of the two side surfaces 82a and 82b of the lock groove 821, the side surface 82b being located on the other rotational direction (arrow R3 direction) side.

Thereby, the clutch device 74 can cause the vehicle steering device 10 to be in a separation state with each lock bar 80 being caused to retract from the lock groove 82 by the advancing/retracting mechanism 84, in which rotational force is not transmitted between the handle-side housing 76 and the tire-side housing 78. On the other hand, in the state (lock state) where the handle-side housing 76 and the tire-side housing 78 are connected together by the advancing/retracting mechanism 84, the clutch device 74 can transmit rotational force to the tire-side housing 78 in a state where there is little play, because the lock bar 803 engages the side surface 82a of the two side surfaces of the lock groove 823, the side surface 82a being located on the other rotational direction (arrow R4 direction) side, when the handle-side housing 76 is rotated in one rotational direction (e.g., arrow R3 direction). Alternatively, when the handle-side housing 76 is rotated in the other rotational direction (e.g., arrow R4 direction), the lock bar 801 engages the side surface 82b of the two side surfaces of the lock groove 821, the side surface 82b being located on the one rotational direction (arrow R3 direction) side, and hence rotational force can be transmitted to the tire-side housing 78 in a state where there is little play.

Additionally, the clutch device 74 is configured such that: the lock bar 80 is retracted from the lock groove 82 with force larger than the biasing force of the spring 90 by the movement occurring when the rotary type solenoid 92 is powered; and when the power supply to the rotary type solenoid 92 is stopped, the lock bars 802 and 803 enter the lock grooves 82 by the biasing force of the spring 90. Thereby, in an emergency when the power supply to the rotary type solenoid 92 is stopped, the handle-side housing 76 and the tire-side housing 78 are instantly connected together with the lock bars 802 and 803 entering the lock grooves 82.

Additionally, the clutch device 74 causes the lock bars 80 to advance and retract by converting a rotational movement of the rotary type solenoid 92, and hence the length in the shaft direction of the clutch device can be suppressed.

As illustrated in each of the aforementioned embodiments, each clutch device is configured such that, when the power supply to an actuator is stopped, at least one lock bar enters a lock groove. The clutch device is also configured such that: at least one lock bar surely engages a lock groove by an rotational operation whose rotation angle is smaller than or equal to the gap angle δ upon connection; and at the timing another lock bar enters another lock groove. Thereby, a lock state where there is little play can be achieved by pinching the side surfaces of two different lock grooves with two lock bars.

Further, each clutch device is not caused to be in a separation state by high torque like a friction clutch. Furthermore, the movements of a plurality of lock bars can be achieved in tandem with the movement of one actuator in each clutch device, and hence the respective lock bars can be easily synchronized with each other. Still furthermore, when a clutch is released (clutch OFF) in each clutch device, the positions of all lock bars are restricted by an actuator, and hence the lock bars can be stably fixed. On the other hand, when the clutch is connected (clutch ON), the lock bars can be individually moved by a spring with the restriction on the positions of the lock bars by the actuator being released, and hence the lock bars that enter lock grooves and those that do not enter lock grooves can be individually moved.

The present invention has been described above with reference to the aforementioned respective embodiments, but the invention is not limited to the aforementioned respective embodiments, and variations in which each component of the embodiments is appropriately combined or substituted are also encompassed by the invention. In addition, appropriate changes of the combinations or the orders of the processes in the aforementioned embodiments can be made and various modifications, such as design modifications, can be made with respect to the aforementioned embodiments, based on the knowledge of those skilled in the art, and embodiments in which such modifications are made can also be encompassed by the present invention.

In each of the aforementioned embodiments, a clutch device has been described, in which lock grooves are provided in the inner circumference of a handle-side housing and lock bars are provided in a tire-side housing; however, another clutch device may be adopted, in which lock bars are provided in a handle-side housing and lock grooves are provided in the outer circumference of a tire-side housing.

Description of The Reference Numerals
   10 VEHICLE STEERING DEVICE
   24 TURNING MOTOR
   28 ECU
   29 CLUTCH DEVICE
   30 STEERING ACTUATOR
   32 TURNING ACTUATOR
   36 HANDLE-SIDE HOUSING
   38 TIRE-SIDE HOUSING
   38A OPENING
   40 LOCK BAR
   40A CONCAVE PORTION
   40B THROUGH-HOLE
   42 LOCK GROOVE
   42A, 423 SIDE SURFACE
   44 ADVANCING/RETRACTING MECHANISM
   50 SPRING 52 PULL TYPE SOLENOID
52A SHAFT
54 PIN
54A FIRST ENGAGING PART
54B SECOND ENGAGING PART
54C INCLINED SURFACE
74 CLUTCH DEVICE
76 HANDLE-SIDE HOUSINGS
78 TIRE-SIDE HOUSING
78A OPENING
80 LOCK BAR
80A CONCAVE PORTION
80B NOTCH GROOVE
82 LOCK GROOVE
82A, 82B SIDE SURFACE
83 PROTRUDING PORTION
84 ADVANCING/RETRACTING MECHANISM
90 SPRING
92 ROTARY TYPE SOLENOID
92A SHAFT
94 PIN
96 TURNTABLE Industrial Applicability The present invention relates to a clutch device, and can be particularly used in vehicle steering devices.

The invention claimed is:

1. A clutch device that switches transmission and cutoff of rotational force between two rotating shafts, the clutch device comprising:
a first rotating shaft in which a plurality of groove portions are formed to be spaced apart from each other in an inner or outer circumference and in a circumferential direction;
a second rotating shaft that is arranged coaxially with the first rotating shaft and arranged such that at least part of the second rotating shaft overlaps the first rotating shaft;
a plurality of engaging parts that are provided on the second rotating shaft so as to be capable of moving in a radial direction of the second rotating shaft and arranged to be spaced apart from each other in a circumferential direction of the second rotating shaft; and
an advancing/retracting mechanism that causes the engaging part to advance and retract in a direction toward the groove portion, wherein
the plurality of engaging parts have: a first engaging part that enters any one first groove portion of the plurality of groove portions, when the plurality of engaging parts are moved toward the plurality of groove portions by the advancing/retracting mechanism, irrespective of a rotational phase difference between the first rotating shaft and the second rotating shaft; and a second engaging part that enters a second groove portion different from the first groove portion, when the first engaging part moves in one rotational direction of the clockwise and counter-clockwise directions in a state of entering the first groove portion and engages one of the two side surfaces of the first groove portion, the one side surface being located on the one rotational direction side, and wherein
the second engaging part is configured such that: when entering the second groove portion, the second engaging part engages one of the two side surfaces of the second groove portion, the one side surface being located on the other rotational direction side.

2. The clutch device according to claim 1, wherein
the advancing/retracting mechanism has both an actuator driven by electricity and a biasing member that biases the engaging part toward the groove portion, and wherein
the advancing/retracting mechanism is configured such that: the advancing/retracting mechanism causes the engaging part to retract from the groove portion with force larger than the biasing force of the biasing member by a movement occurring when the actuator is powered; and when the power supply to the actuator is stopped, the advancing/retracting mechanism causes the first engaging part to enter the first groove portion by the biasing force of the biasing member.

3. The clutch device according to claim 2, wherein
the actuator is a rotary type solenoid, and wherein
the advancing/retracting mechanism further includes a conversion mechanism that causes the engaging part to advance and retract by converting a rotational movement of the rotary type solenoid.

4. The clutch device according to claim 1, wherein
when it is assumed that: the number of the plurality of groove portions is n, the pitch of the groove portions is P, the number of the plurality of engaging parts is N, the number of engaging parts that enter the plurality of groove portions is Nx, the width of the engaging part is W, the width of the groove portion is B1, a distance between the adjacent groove portions is B2, and a gap angle occurring when the engaging portion is engaged with the groove portion is $\delta$, the engaging parts and the groove portions are provided to satisfy:

$P = 360/n;$ $B1 \approx W + (\delta \times (Nx-1));$ and $\delta = P/N.$

5. A steering device comprising:
an operation member that is rotated for steering a vehicle;
a detection device that detects information in accordance with an operation amount of the operation member;
a turning mechanism that turns a wheel;
a power source that drives the turning mechanism;
the clutch device of claim 1 that is arranged between the operation member and the turning mechanism and switches transmission and cutoff of rotational force between the operation member and the turning mechanism; and
a controller that drives the power source in a state where the rotational force is cut off by the clutch device and that controls a turning amount based on the information in accordance with the operation amount, wherein
the operation member is coupled to one of the first rotating shaft and the second rotating shaft, and wherein
the turning mechanism is coupled to the other of the first rotating shaft and the second rotating shaft, and wherein
the clutch device is configured in the following way: the first rotating shaft and the second rotating shaft are mechanically coupled together such that a steering angle of the wheel is changed in accordance with an operation of the operation member in a state where the rotational force between the operation member and the turning mechanism can be transmitted.

* * * * *